(12) United States Patent
Crowder et al.

(10) Patent No.: US 9,645,404 B2
(45) Date of Patent: May 9, 2017

(54) LOW-PROFILE BOUNCE CHAMBER FOR PEPPER'S GHOST ILLUSION

(71) Applicant: VENTANA 3D, LLC, Santa Monica, CA (US)

(72) Inventors: Ashley Crowder, Venice, CA (US); Benjamin Conway, Santa Monica, CA (US); Troy P. Senkiewicz, Toluca Lake, CA (US)

(73) Assignee: VENTANA 3D, LLC, Van Nuys, CA (US)

( * ) Notice: Subject to any disclaimer, the term of this patent is extended or adjusted under 35 U.S.C. 154(b) by 0 days.

(21) Appl. No.: 14/939,798

(22) Filed: Nov. 12, 2015

(65) Prior Publication Data

US 2016/0131919 A1    May 12, 2016

Related U.S. Application Data

(60) Provisional application No. 62/078,503, filed on Nov. 12, 2014, provisional application No. 62/132,486, filed on Mar. 12, 2015.

(51) Int. Cl.
| | |
|---|---|
| *G02B 27/22* | (2006.01) |
| *G03B 21/20* | (2006.01) |
| *G03B 21/62* | (2014.01) |
| *G03B 21/28* | (2006.01) |

(52) U.S. Cl.
CPC ...... *G02B 27/2292* (2013.01); *G02B 27/2235* (2013.01); *G03B 21/208* (2013.01); *G03B 21/62* (2013.01); *G03B 21/28* (2013.01)

(58) Field of Classification Search
CPC ...... G03B 21/10; G03B 21/28; G03B 21/145; G03B 21/208; G03B 21/606; G03B 21/625; G03B 35/18; G03B 35/24
See application file for complete search history.

(56) References Cited

U.S. PATENT DOCUMENTS

| | | | | |
|---|---|---|---|---|
| 5,685,625 A | * | 11/1997 | Beaver | A63J 5/021 353/28 |
| 2014/0002800 A1 | * | 1/2014 | Edwards | G03B 21/16 353/10 |

* cited by examiner

*Primary Examiner* — Sultan Chowdhury
(74) *Attorney, Agent, or Firm* — Parker Ibrahim & Berg LLC; James M. Behmke; Stephen D. LeBarron

(57) ABSTRACT

Systems and methods herein are directed to creating a holographic image (e.g., in line with Pepper's Ghost Illusion) using a low-profile bounce chamber. As described herein, a bounce is provided at an angle (e.g., a 45-degree angle) to a holographic screen/foil in a Pepper's Ghost Illusion setup. One the same side of the bounce is an image projector that directs an image onto a mirror, which then reflects and disperses the image onto the bounce. In one embodiment, the bounce is a rear projection bounce, under which the projector and mirror reside. In another embodiment, the projector and mirror are arranged for a front projection bounce.

20 Claims, 24 Drawing Sheets

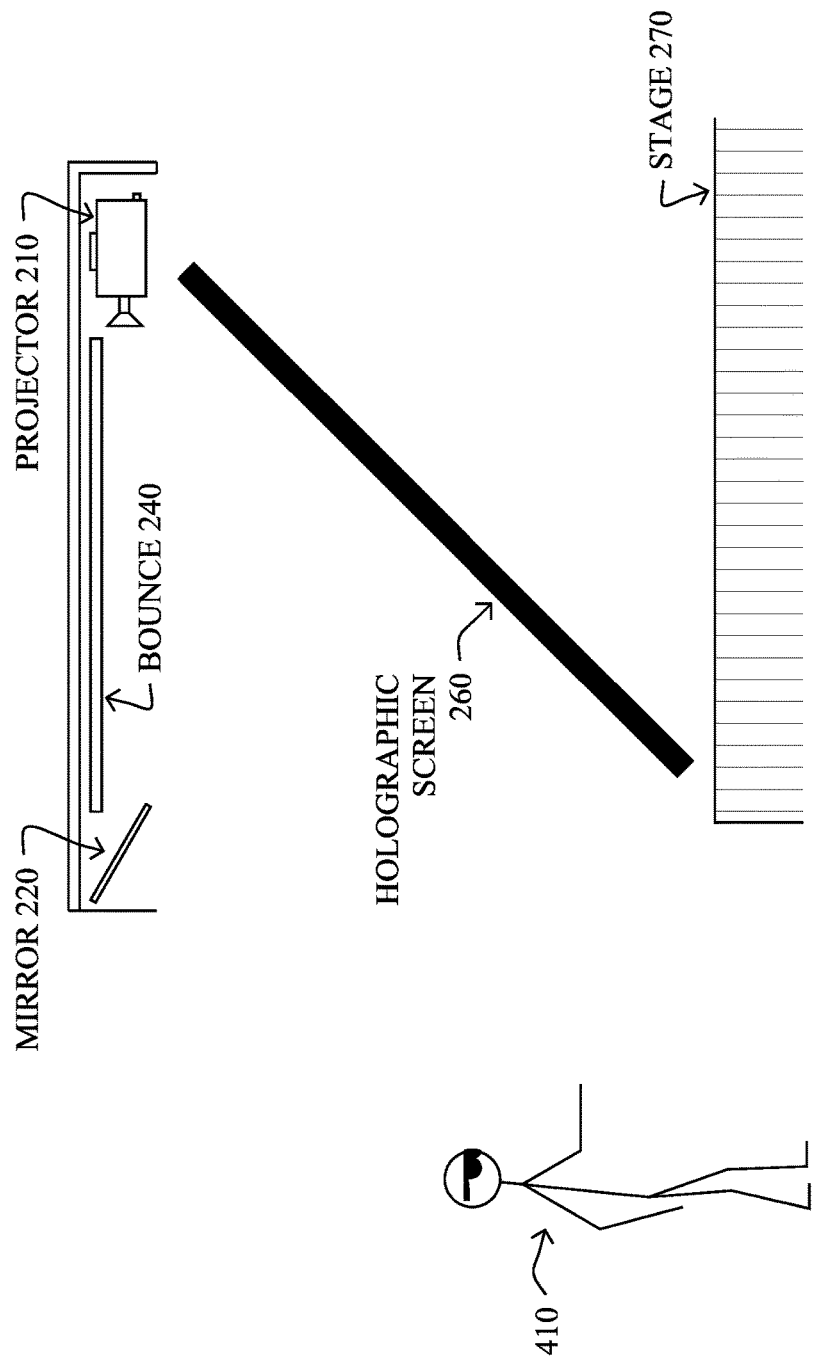

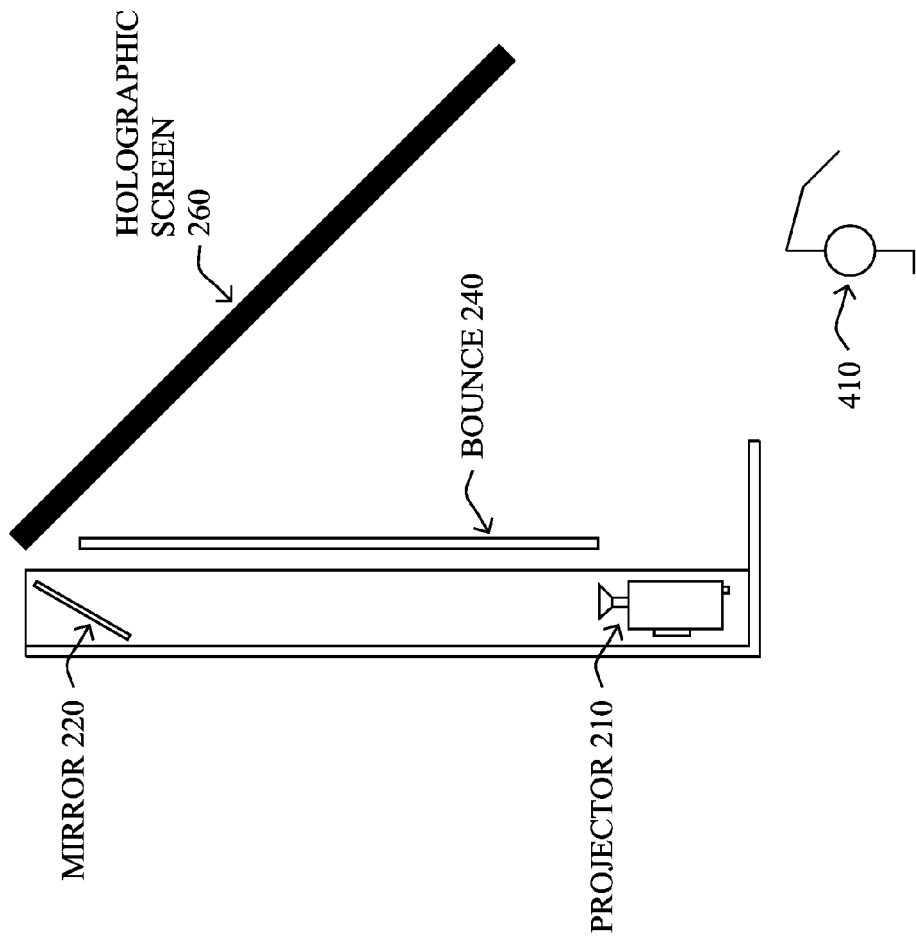

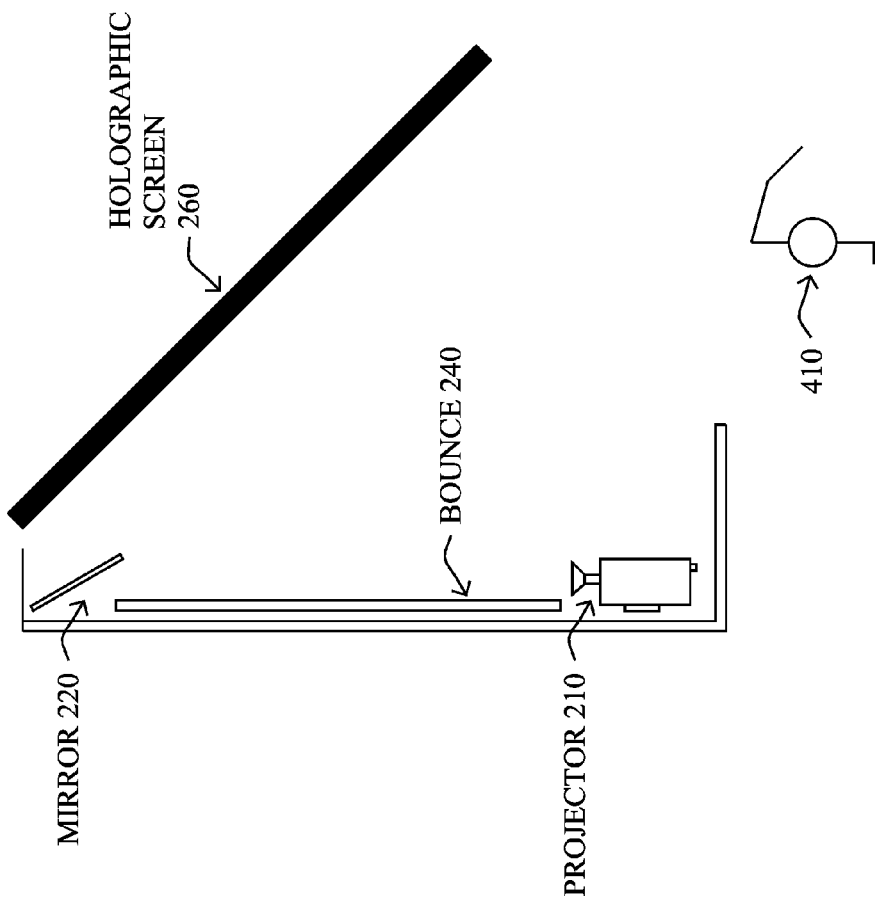

LOW-PROFILE BOUNCE CHAMBER FOR PEPPER'S GHOST ILLUSION

RELATED APPLICATIONS

The present application claims priority to U.S. Provisional Patent Application Ser. No. 62/078,503, entitled "HOLOGRAPHIC PROJECTION SYSTEM AND ENHANCED PEPPER'S GHOST ILLUSION", filed on Nov. 12, 2014 by Crowder et al., the entire contents of which being incorporated by reference in its entirety.

The present application also claims priority to U.S. Provisional Patent Application Ser. No. 62/132,486, entitled "LOW-PROFILE BOUNCE CHAMBER FOR PEPPER'S GHOST ILLUSION", filed on Mar. 12, 2015 by Crowder et al., the entire contents of which being incorporated by reference in its entirety.

TECHNICAL FIELD

The present disclosure relates generally to holographic projection, and, more particularly, to a low-profile bounce chamber for Pepper's Ghost Illusion.

BACKGROUND

The "Pepper's Ghost Illusion" is an illusion technique known for centuries (named after John Henry Pepper, who popularized the effect), and has historically been used in theatre, haunted houses, dark rides, and magic tricks. It uses plate glass, Plexiglas, or plastic film and special lighting techniques to make objects seem to appear or disappear, become transparent, or to make one object morph into another. Traditionally, for the illusion to work, the viewer must be able to see into a main room, but not into a hidden room. The hidden room may be painted black with only light-colored objects in it. When light is cast on the room, only the light objects reflect the light and appear as ghostly translucent images superimposed in the visible room.

Notably, Pepper's Ghost Illusion systems have generally remained the same since the 19th Century, adding little more over time than the use of projection systems that either direct or reflect light beams onto the transparent angled screen, rather than using live actors in a hidden room. That is, technologies have emerged in the field of holographic projection that essentially mimic the Pepper's Ghost Illusion, using projectors as the light source to send a picture of an object or person with an all-black background onto a flat, high-gain reflection surface (also referred to as a "bounce"), such as white or grey projection screen. The bounce is typically maintained at an approximate 45-degree angle to the transparent screen surface.

For example, a recent trend in live music performances has been to use a holographic projection of a performer (e.g., live-streamed, pre-recorded, or re-constructed). FIG. 1 illustrates an example of a conventional (generally large-scale) holographic projection system 100. Particularly, the streamed (or recorded, or generated) image of the artist (or other object) may be projected onto a reflective surface, such that it appears on an angled screen and the audience sees the artist or object and not the screen. If the screen is transparent, this allows for other objects, such as other live artists, to stand in the background of the screen, and to appear to be standing next to the holographic projection when viewed from the audience.

Still, despite its historic roots, holographic projection technology is an emerging field, particularly with regards to various aspects of enhancing the illusion and/or managing the setup of the system.

SUMMARY

According to one or more embodiments herein, systems and methods are directed to providing a low-profile bounce chamber for Pepper's Ghost Illusion. As described herein, a bounce is provided at an angle (e.g., a 45-degree angle) to a holographic screen/foil in a Pepper's Ghost Illusion setup. One the same side of the bounce is an image projector that directs an image onto a mirror, which then reflects and disperses the image onto the bounce. In one embodiment, the bounce is a rear projection bounce, under which the projector and mirror reside. In another embodiment, the projector and mirror are arranged for a front projection bounce.

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5D illustrate examples of a front-projection-based low-profile bounce chamber for Pepper's Ghost Illusion in accordance with one or more embodiments described herein;

FIGS. 7A-7D illustrate examples of a side orientation for low-profile bounce chambers for Pepper's Ghost Illusion in accordance with one or more embodiments described herein;

DESCRIPTION OF EXAMPLE EMBODIMENTS

Figure 1:
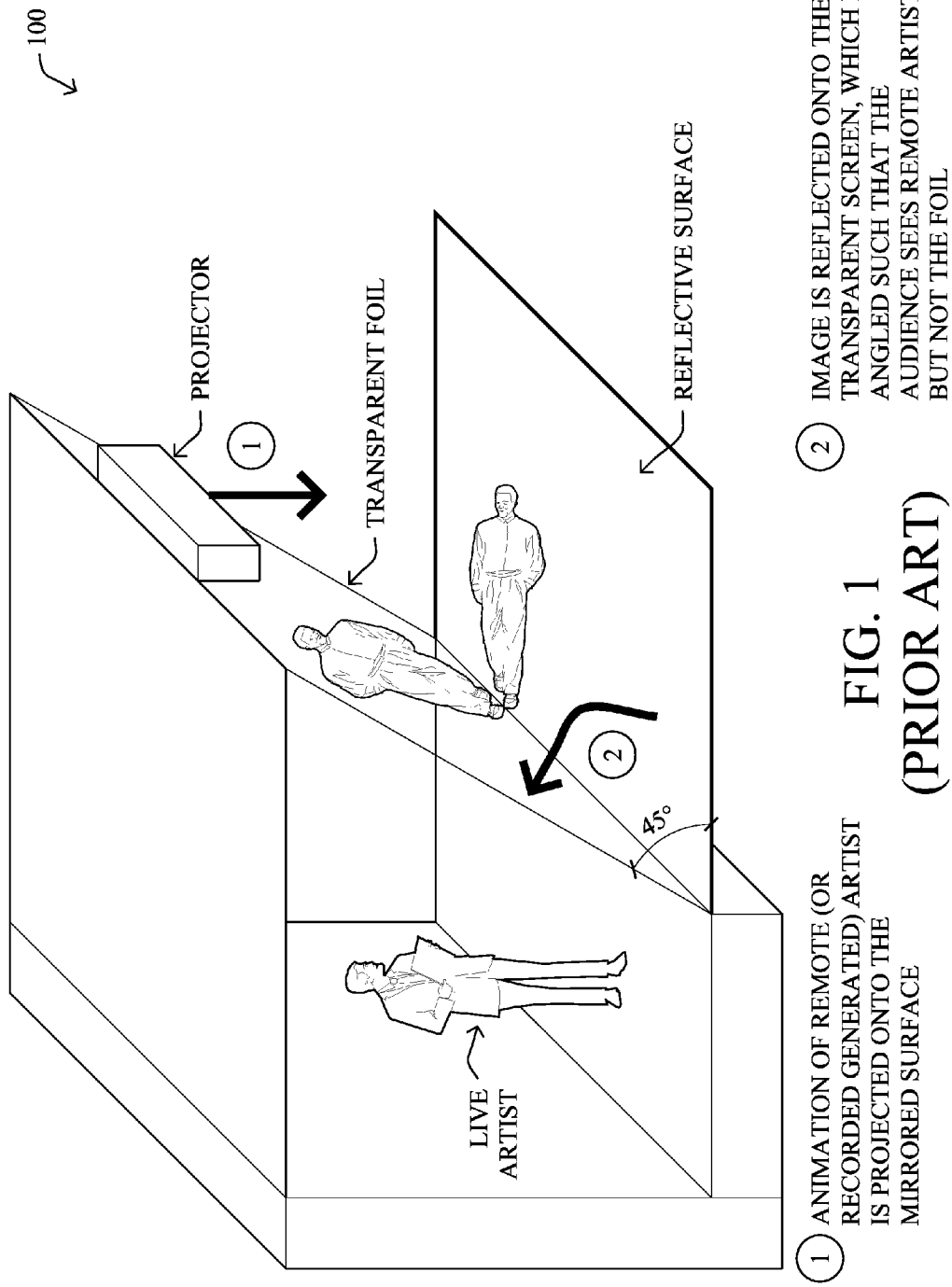
FIG. 1 illustrates an example of well-known holographic projection techniques.

As noted above, the "Pepper's Ghost Illusion" is an illusion technique that uses plate glass, Plexiglas, or plastic film and special lighting techniques to make holographic projections of people or objects. FIG. 1, in particular, illustrates an example of holographic projection using projectors as the light source to send a picture of an object or person with an all-black background onto a flat, high-gain reflection surface (or "bounce"), such as white or grey projection screen. The bounce is typically maintained at an approximate 45-degree angle to the transparent screen surface.

Though projection-based systems are suitable in many situations, particularly large-scale uses, there are certain issues with using projectors in this manner. For example, if atmosphere (e.g., smoke from a fog machine) is released, the viewer can see where the light is coming from, thus ruining the effect. Also, projectors are not typically bright enough to shine through atmosphere, which causes the reflected image to look dull and ghost-like. Moreover, many projectors are large and heavy, which leads to increased space requirements and difficulty rigging.

Figure 2:
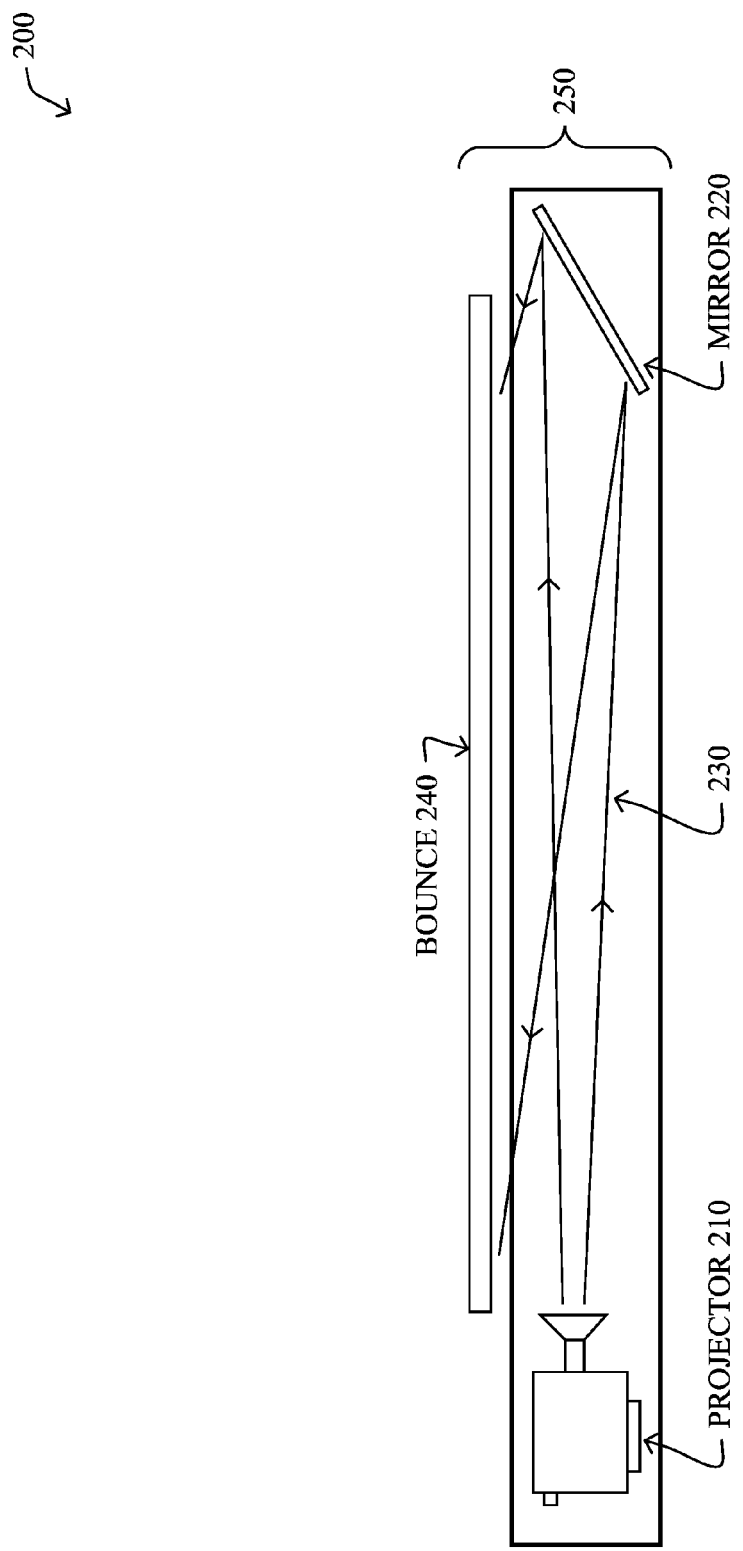
FIG. 2 illustrates an example low-profile bounce chamber for Pepper's Ghost Illusion in accordance with one or more embodiments described herein.

According to the present invention, a "low-profile" bounce chamber may be used to alleviate the problems associated with conventional projection techniques in a Pepper's Ghost Illusion setup. In particular, with reference generally to FIG. 2, a holographic projection system 200 may have a projector 210 that projects an image onto a mirror 220, which then reflects (redirects) the light beam/image 230 onto a bounce 240. The angle of the mirror is set such that the reflected image disperses or "spreads out" the image onto the bounce, allowing the low-profile arrangement to provide a full-size image of a displayed object. The bounce chamber 250 thus comprises projector 210, mirror 220, and bounce 240.

Notably, as illustrated further below, the projection system herein can either reflect the image from a projector onto the "back" surface of the bounce (e.g., "rear projection", as will be appreciated by those skilled in the art), or else onto the "front" surface of the bounce ("e.g., "front projection"). Note further that the system herein allows for holographic projection for any size setup, such as from personal "mini" systems (e.g., personal projectors) up to the larger full-stage-size systems. (Also note that the angles, sizes, distances, etc. shown in any of the figures herein are merely for illustration and are not meant to be to scale, nor taken as a limitation.)

Figure 3A:
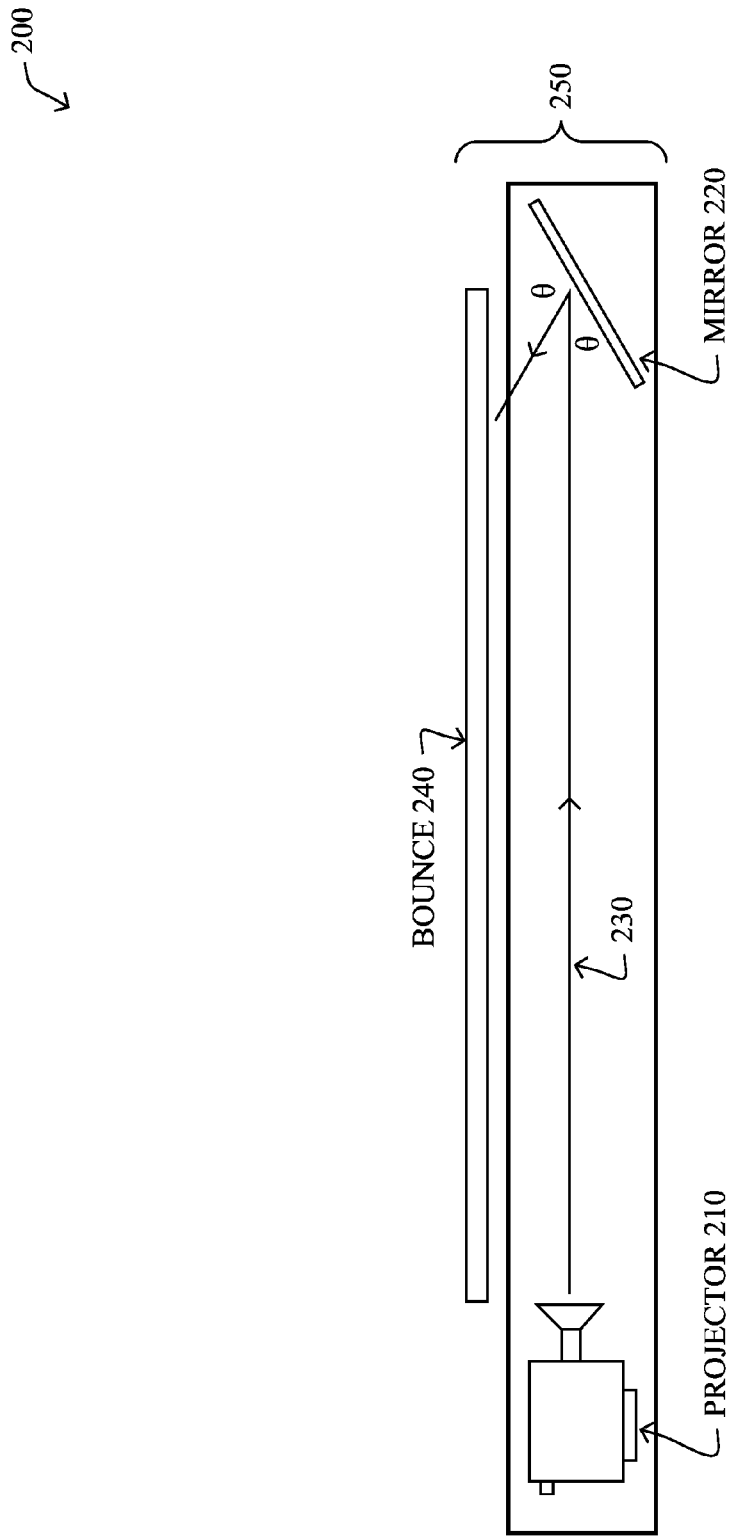
FIGS. 3A-3D illustrate examples of optical effects of a low-profile bounce chamber for Pepper's Ghost Illusion in accordance with one or more embodiments described herein.
Figure 3B:
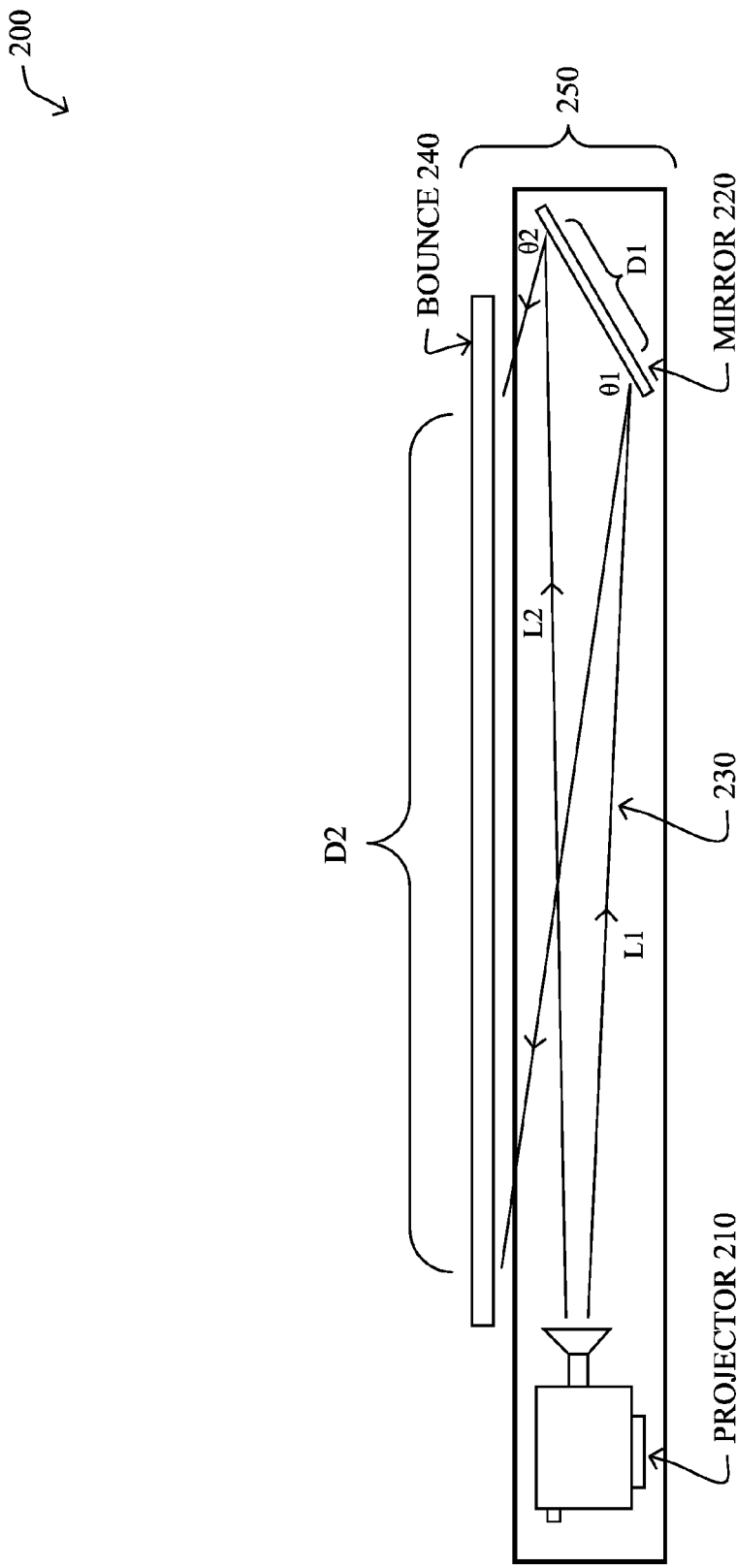

In general, as illustrated in FIG. 3A, when a beam of light 230 hits a reflective surface such as a mirror 220, the light beam 230 reflects off the surface at the same angle (theta) at which the light strikes the surface. The projector 210 and mirror 220 may therefore be configured at an angle to one another that is most suitable for the particular arrangement desired. In particular, as shown in FIG. 3B, because of the low-profile nature of the techniques herein, the mirror 220 may be used to help spread the image across the entire surface of bounce 240. That is, as shown in FIG. 3B, a projector 210 may produce an image that starts at light beam L1 and ends at light beam L2. Most projectors spread the image apart from the source (e.g., moving a projector farther away from a wall creates a larger image). When the image 230 hits the mirror 220, a range of reflective angles occur, from theta-1 through theta-2 as shown, resulting in reflecting the image 230 onto the bounce 240 at different points, depending on the angle of reflection and the distance the light has to travel to hit the bounce 240. As shown, therefore, the initial distance D1 between the two light beams L1 and L2 on the mirror 220 has been greatly increased into D2 on the bounce 240.

Figure 3C:
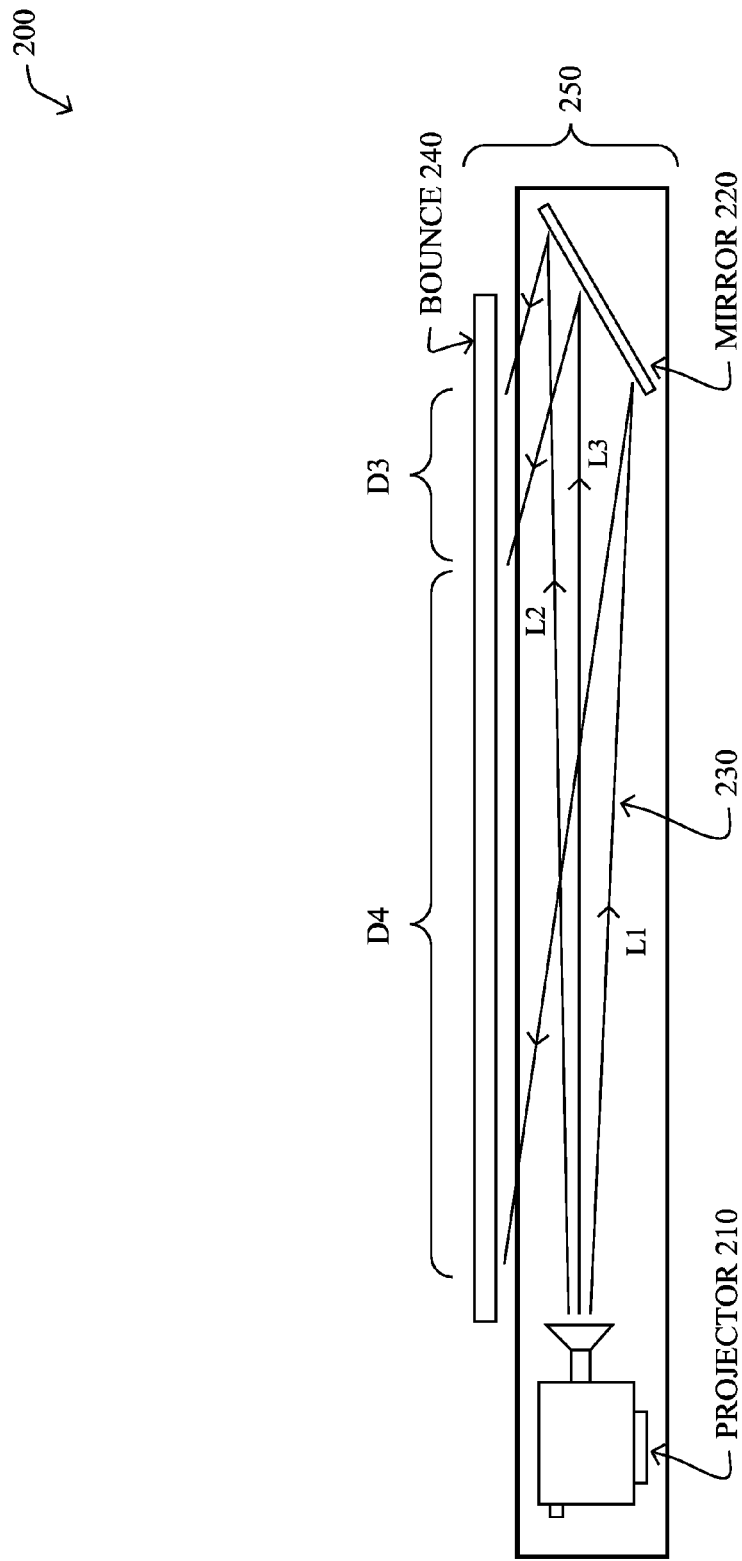

Note that in one embodiment the mirror 220 is a flat plane surface. In such an instance, in one embodiment, the desired image may be graphically altered to account for any noticeable differences in the dispersion rate between the top and bottom of the image. That is, and with reference to FIG. 3C, while a portion closer to the mirror 220 may only be spread out a little (e.g., distance D3 between L2 and L3, a "middle" of the image), a portion of the image 230 farther away from the mirror 220 may appear more spread out (e.g., distance D4 between the middle L3 and L1).

Figure 3D:
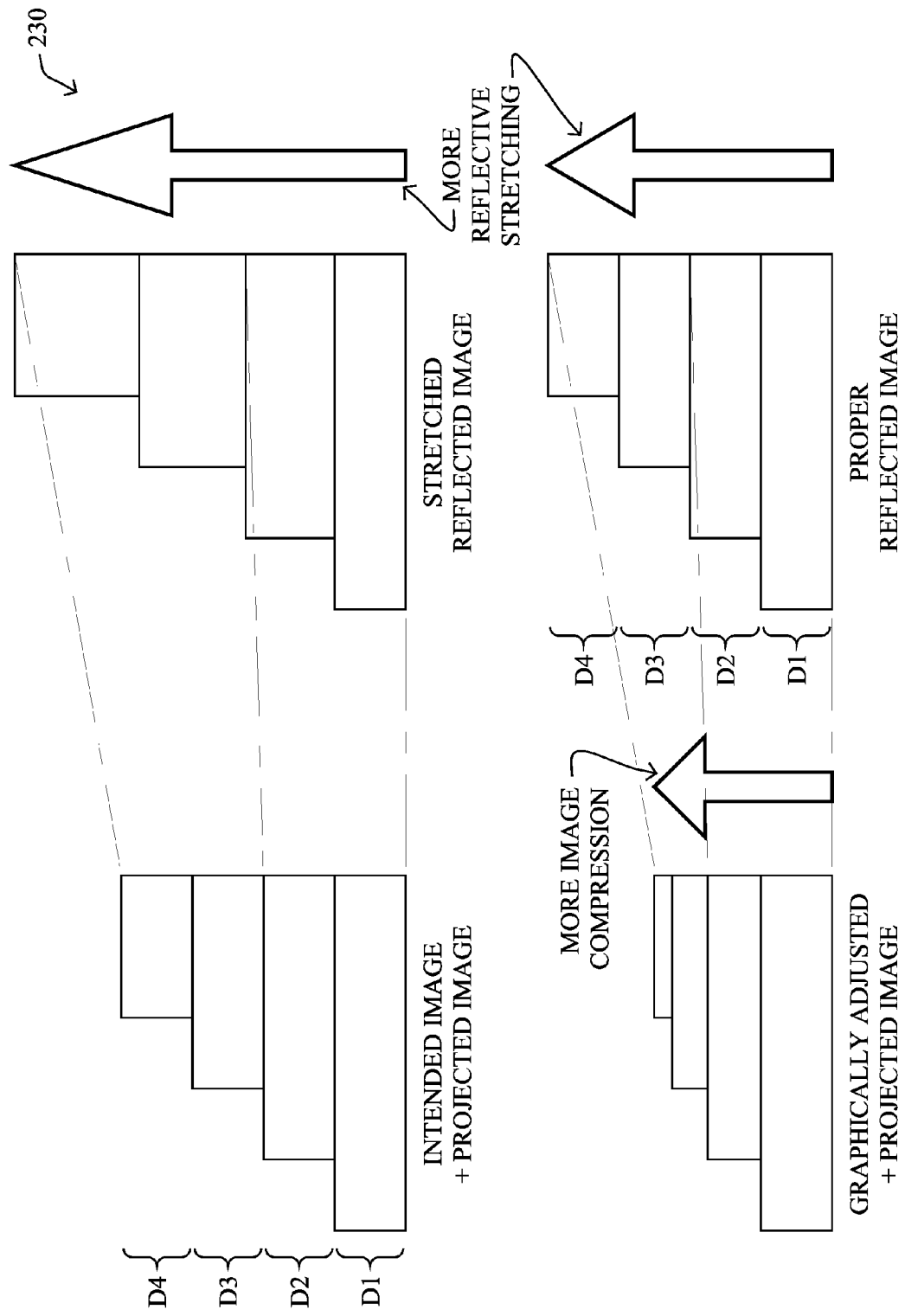

To counter-balance this effect, in one embodiment as shown in FIG. 3D, the image may be graphically altered (e.g., based on a computer algorithm configured to account for the given angles and distances between the respective components) to ensure that the final result projected/reflected onto the bounce maintains the appropriate proportions. For instance, as shown in FIG. 3D, a simple block of stairs is shown with the same height for each step. In order to project this image properly (e.g., such that the distances D3 and D4 don't appear stretched), the image may be compressed more and more as it reaches the top (linearly increased compression). As such, when being reflected, and consequently stretched, the original perspective may again be achieved. Alternatively, in another embodiment, the mirror may be a curved surface or multi-surface mirror to account for the optical dispersion. In this manner, images need not be graphically altered in order to ensure that the final result projected/reflected onto the bounce maintains the appropriate proportions. (Note further that both graphical alteration and alternative mirrors may be used herein in combination.)

Figure 4A:
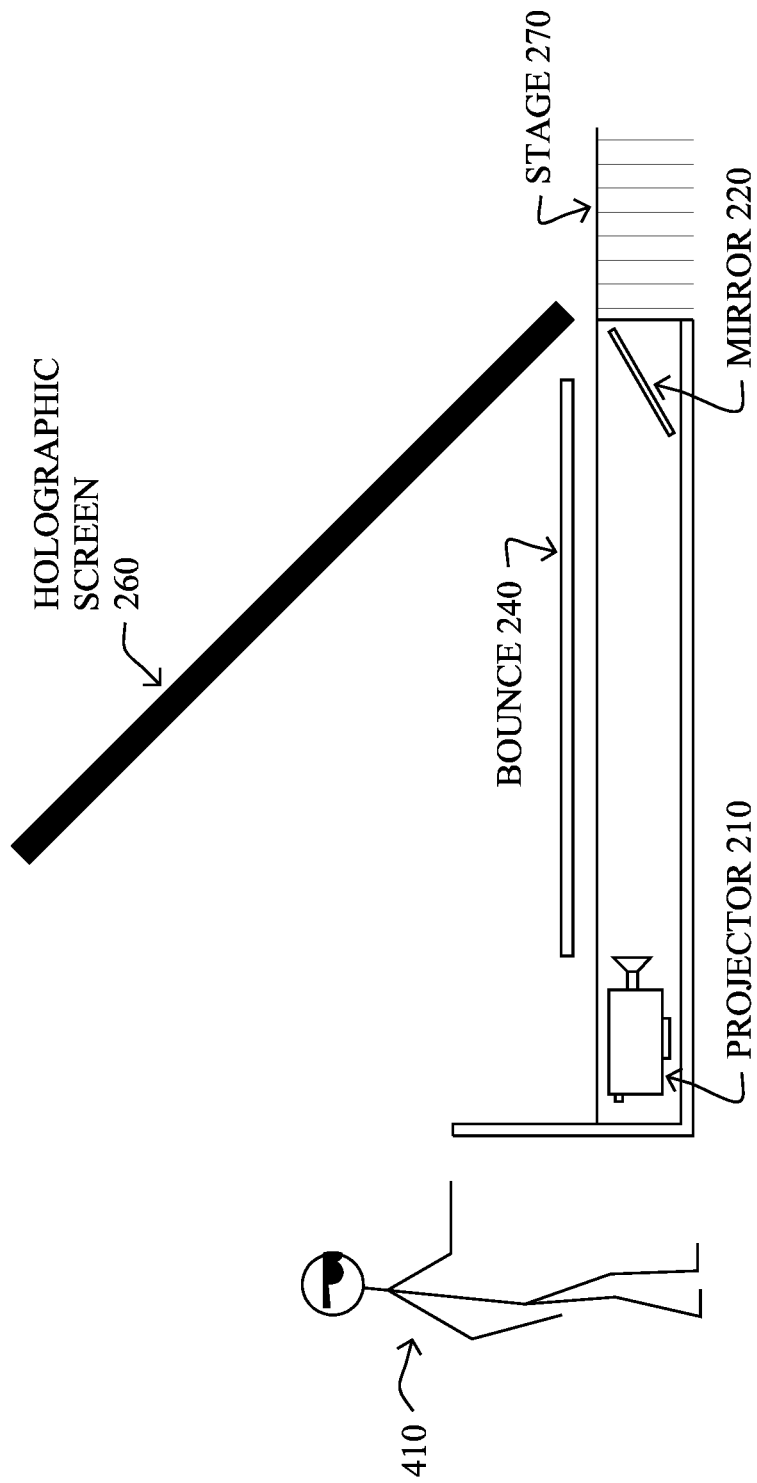
FIGS. 4A-4D illustrate examples of a rear-projection-based low-profile bounce chamber for Pepper's Ghost Illusion in accordance with one or more embodiments described herein.

As shown in FIG. 4A, the bounce chamber may be arranged on the floor of the system, where a projector 210 reflects the image 230 off of the mirror 220 onto the bounce 240 from the back, thus resulting in a rear-projection bounce. The stick figure illustrates the viewer 410, that is, from which side one can see the holographic projection. Note that the system typically provides about 165-degrees of viewing angle. Also note that various dressings and props can be designed to hide various hardware components and/or to build an overall scene, but such items are omitted for clarity.

The transparent screen 260 is generally a flat surface that has similar light properties of clear glass (e.g., glass, plastic such as Plexiglas or tensioned plastic film). A tensioning frame may be used to stretch a clear foil into a stable, wrinkle-free (e.g., and vibration resistant) reflectively transparent surface (that is, displaying/reflecting light images for the holographic projection, but allowing the viewer 410 to see through to the background). Generally, for larger displays it may be easier to use a tensioned plastic film as the reflection surface because glass or rigid plastic (e.g., Plexiglas) is difficult to transport and rig safely, though any material may be used herein. Similar to the typical arrangement, a preferred angle between the image light source (bounce) and the reflective yet transparent surface (clear screen) is an approximate 45-degree angle.

Figure 4B:
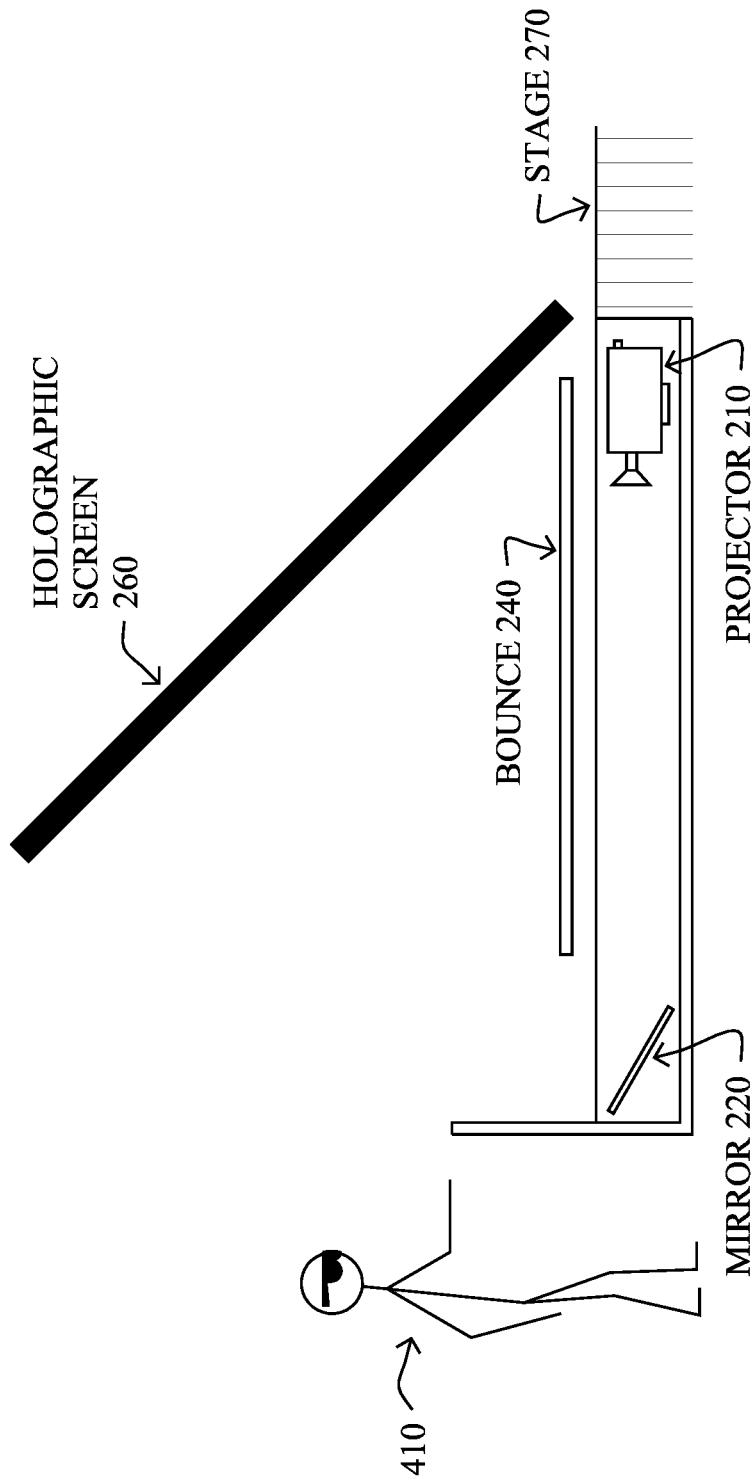

Note that the projector 210 may be located on the user's side of the bounce as shown in FIG. 4A, with the mirror 220 nearer to the holographic screen/foil 260, or else in the alternative, may be swapped such that the projector 210 is located on the side of the holographic screen 160, as shown in FIG. 4B.

Figure 4C:
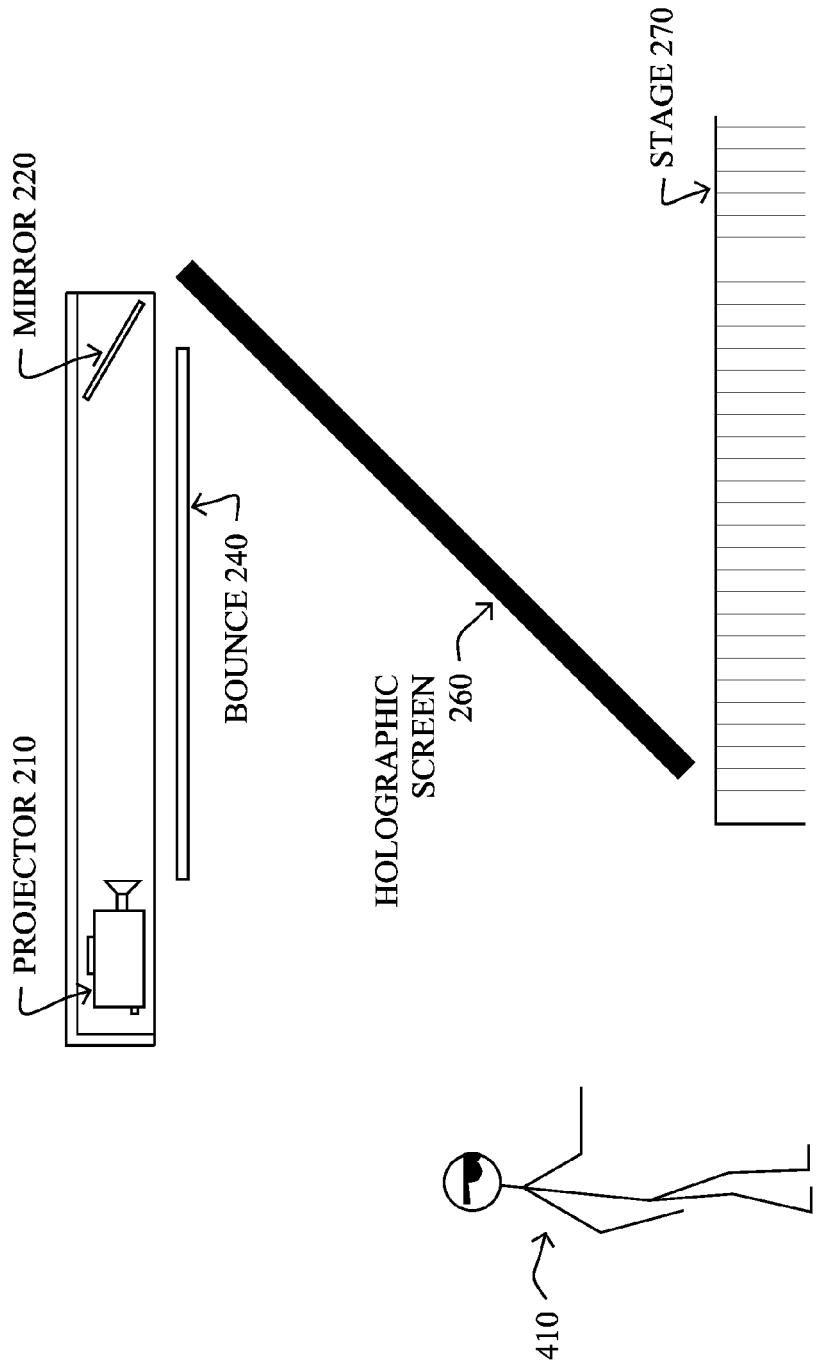
Figure 4D:
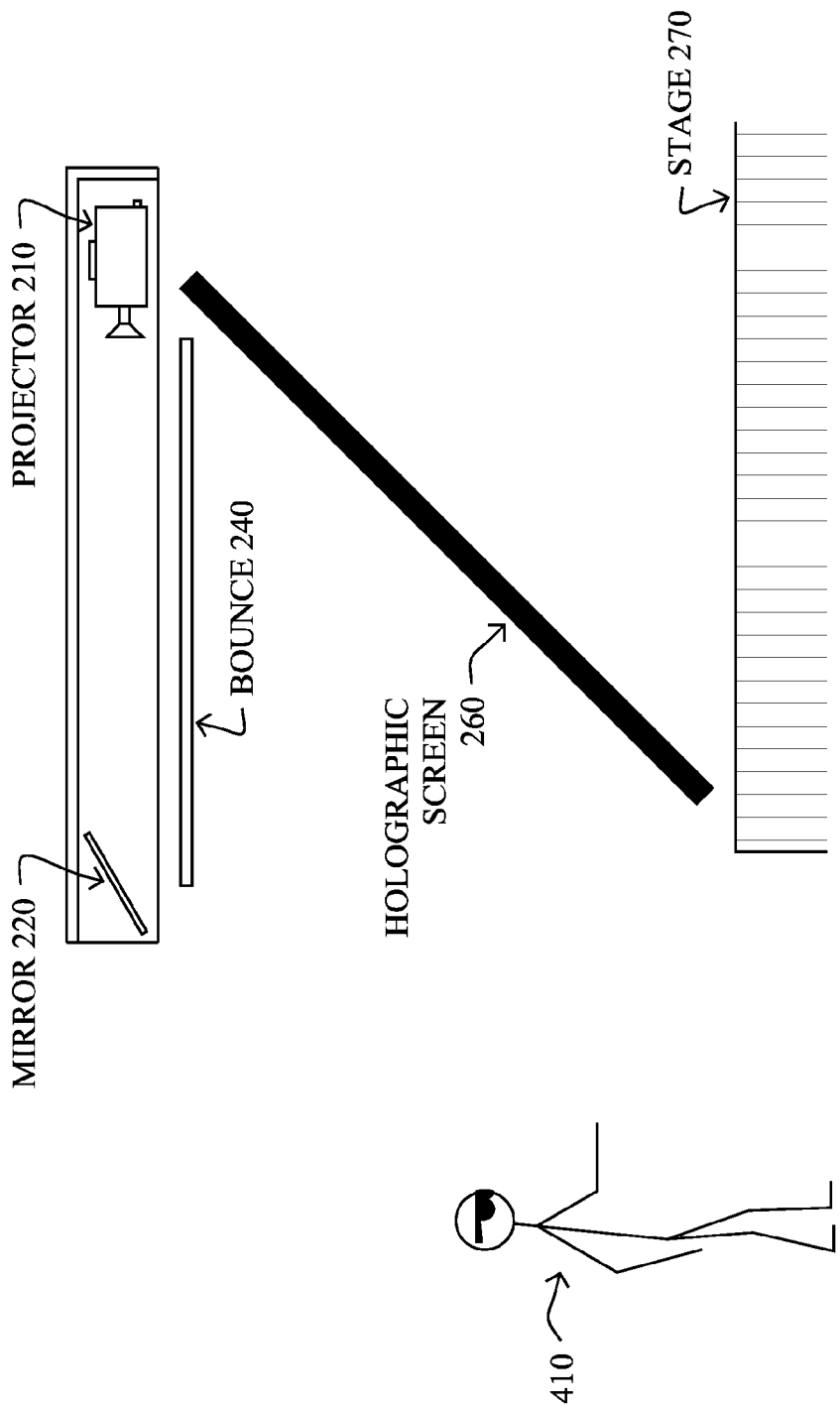
Figure 5A:
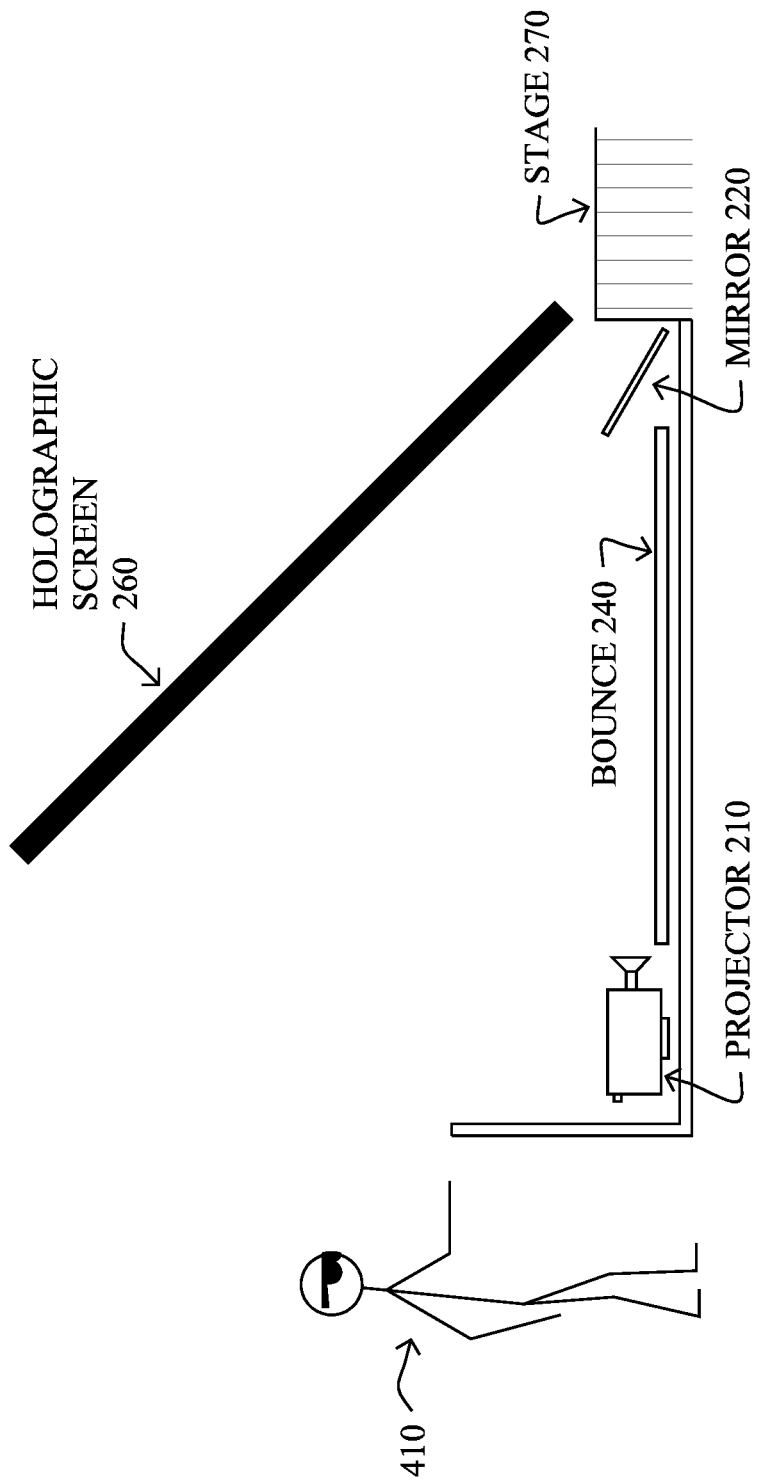
Figure 5B:
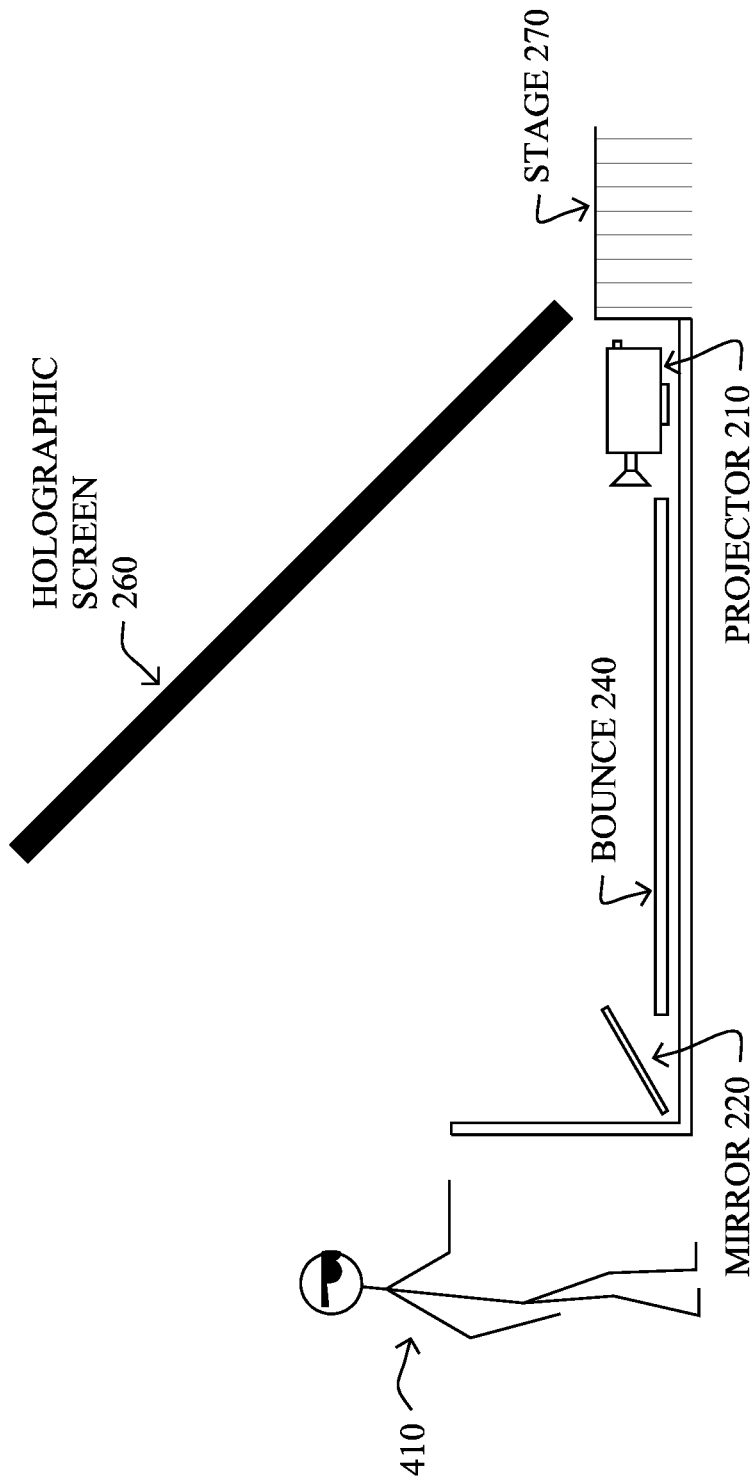
Figure 5C:
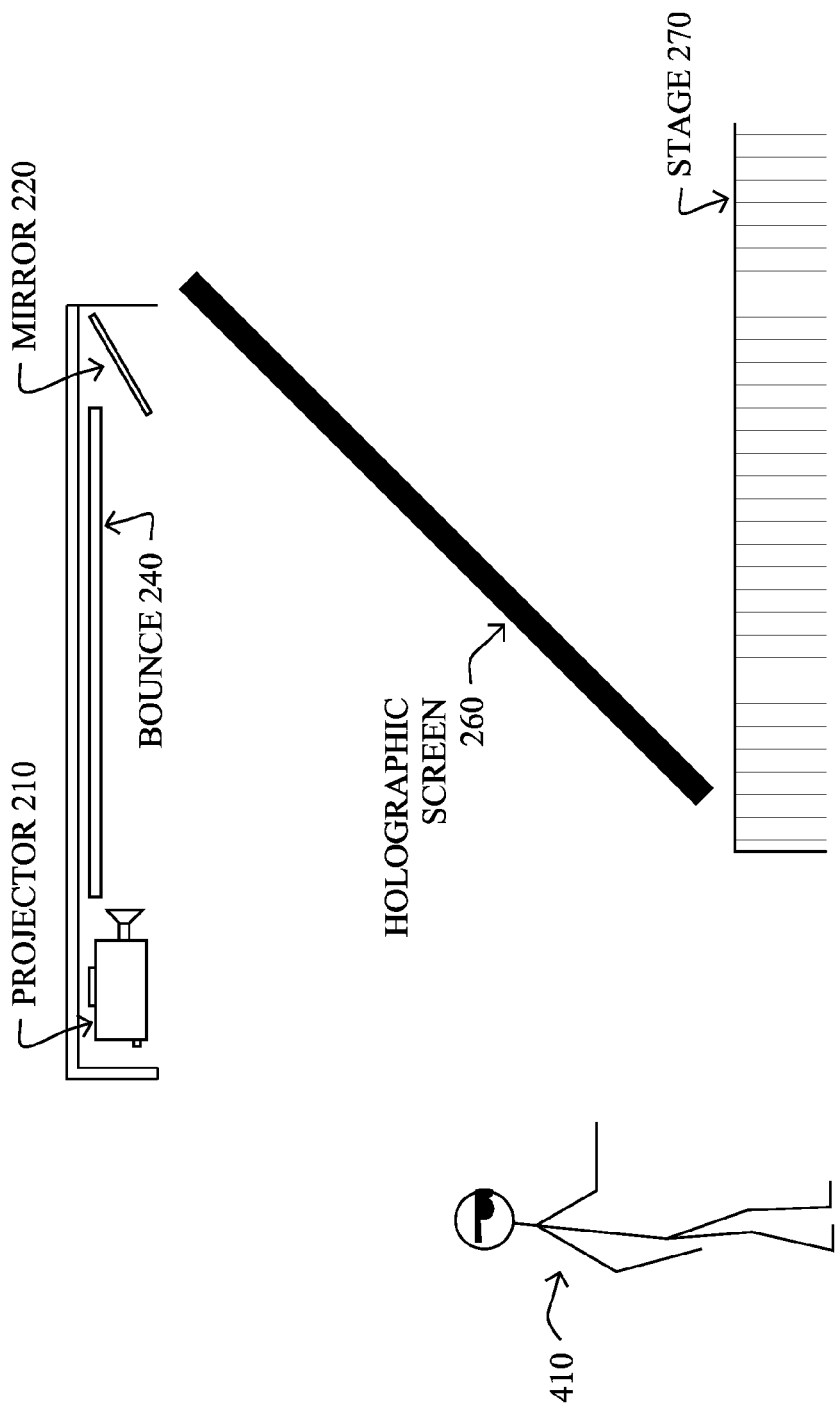

FIGS. 4C-4D illustrate alternative arrangements for a low-profile bounce system, namely where the projector 210 and bounce 240 are located on the ceiling. In this arrangement, the same effect can be achieved as in FIGS. 4A-4B, though there are various considerations as to whether to use a particular location of the projector 210 as in FIGS. 4A-4B versus FIGS. 4C-4D.

In accordance with one or more additional embodiments of the present invention, the bounce "chamber" 250 of FIGS. 4A-4D may be configured as a "front-projection" bounce, rather than a rear-projection bounce. That is, the term "chamber" is not meant to limit the present invention to any sort of enclosed space, and the bounce 240 itself may be placed in a position relative to the projector 210 and mirror 220 in a manner that allows for the front-projection display of the image. FIGS. 5A-5D illustrate examples of front-projection low-profile bounce "chambers" in accordance with one or more embodiments of the present invention herein.

Figure 6:
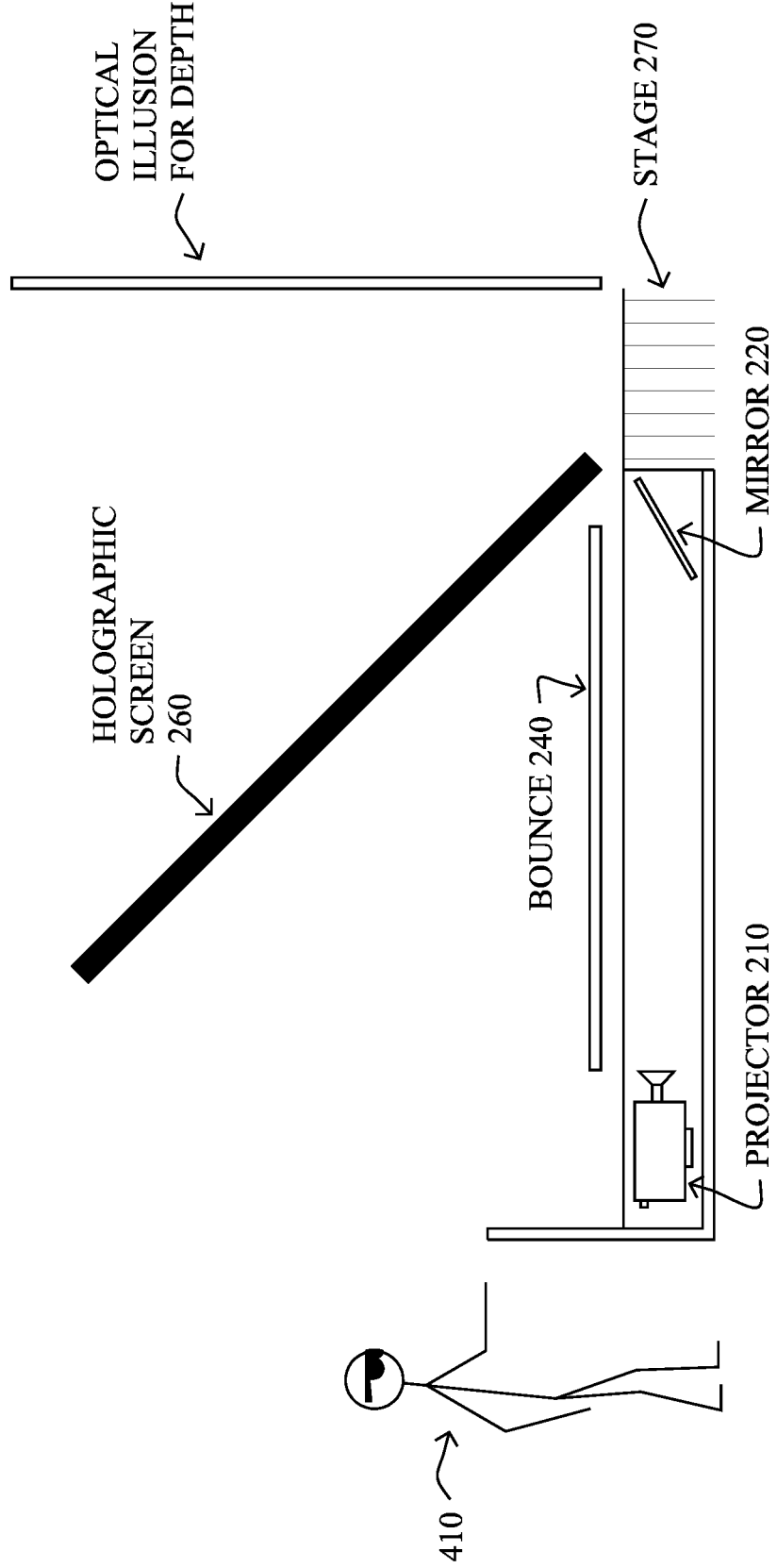
FIG. 6 illustrates an example of an optical illusion background added behind the screen.
Figure 7B:
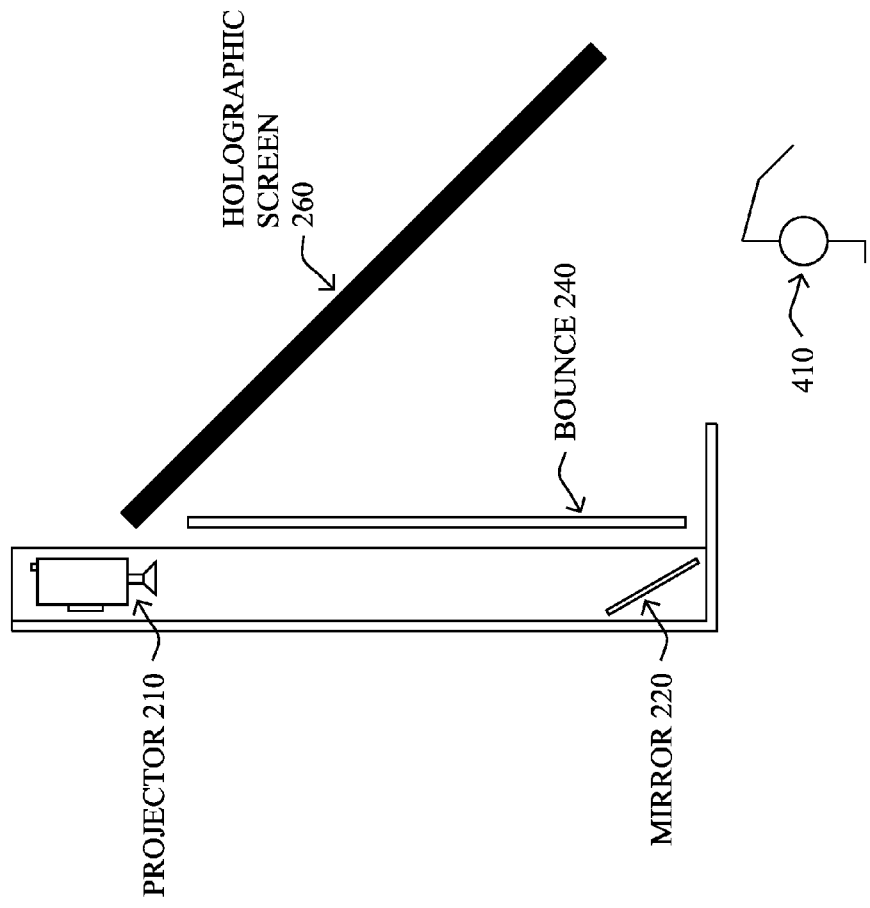
Figure 7D:
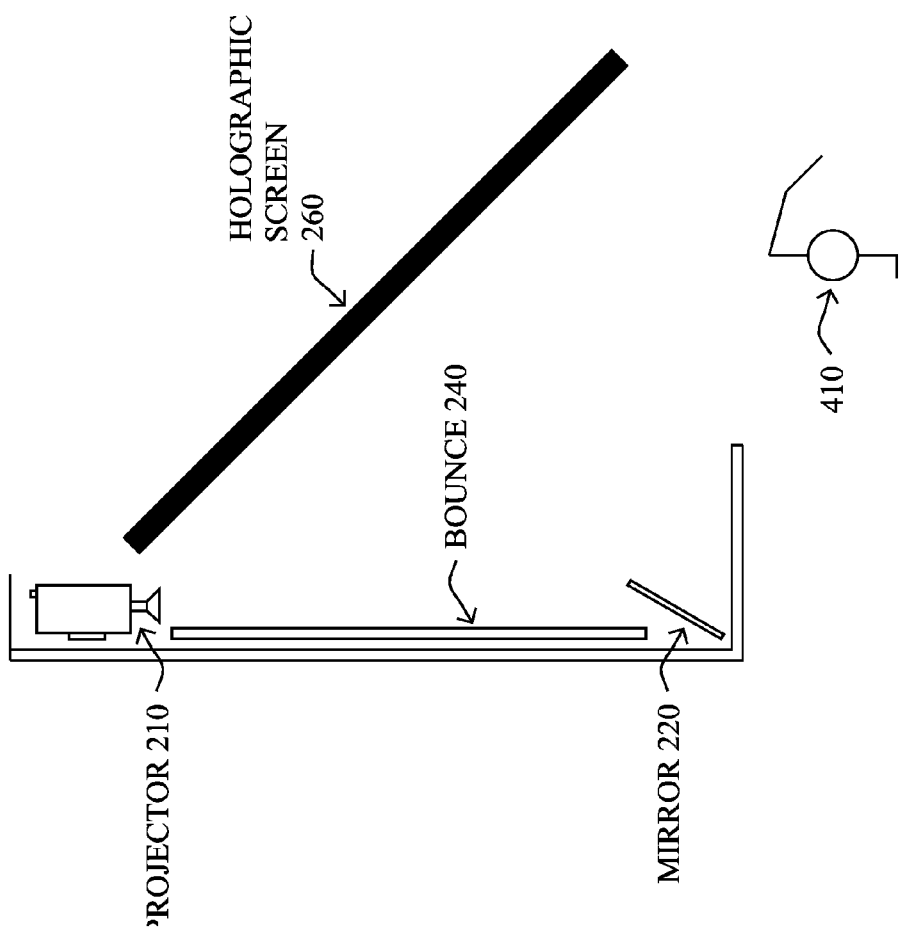
Figure 8A:
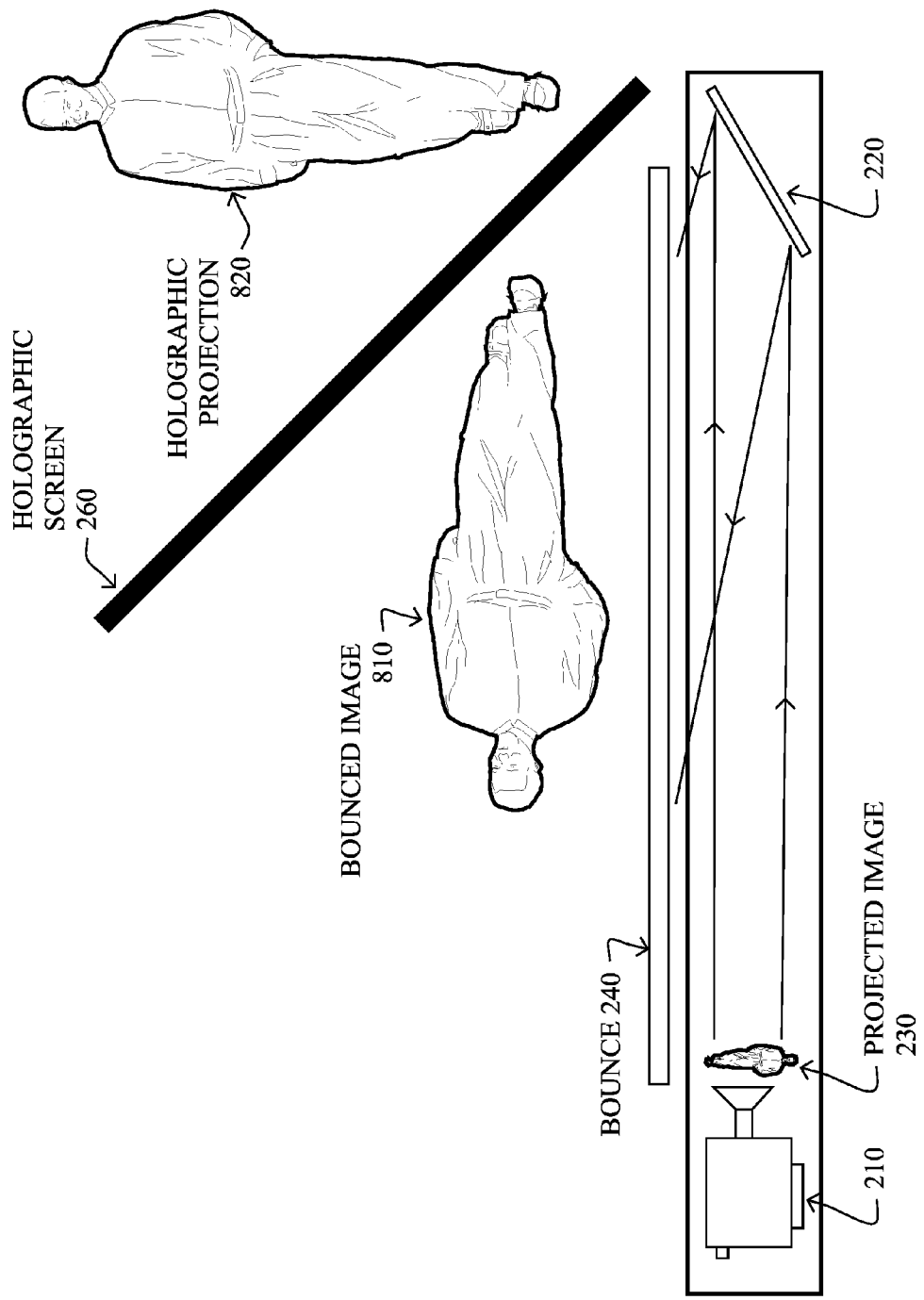
FIGS. 8A-8D illustrate example of vertical orientation management for low-profile bounce chambers for Pepper's Ghost Illusion in accordance with one or more embodiments described herein.
Figure 8B:
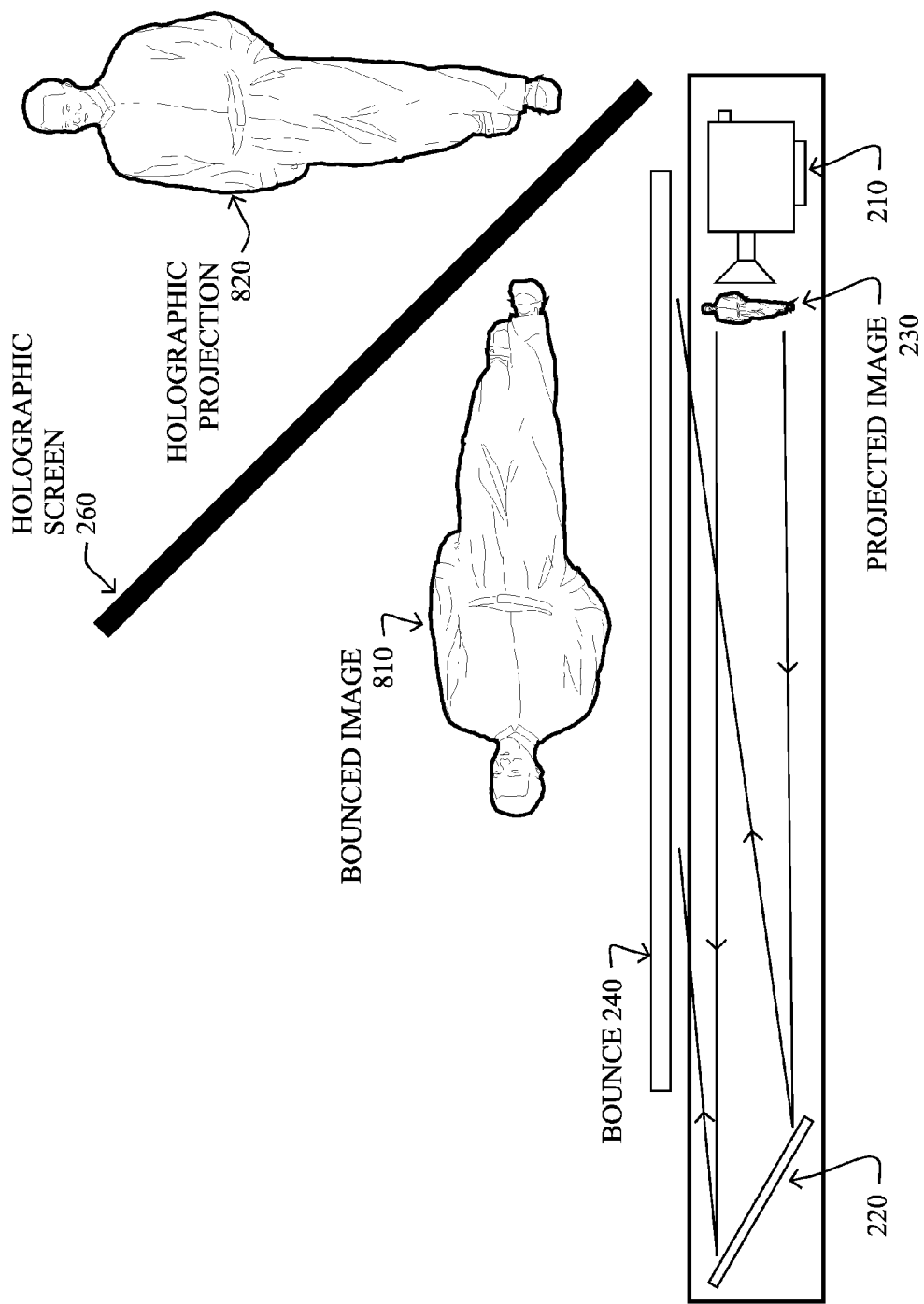
Figure 8C:
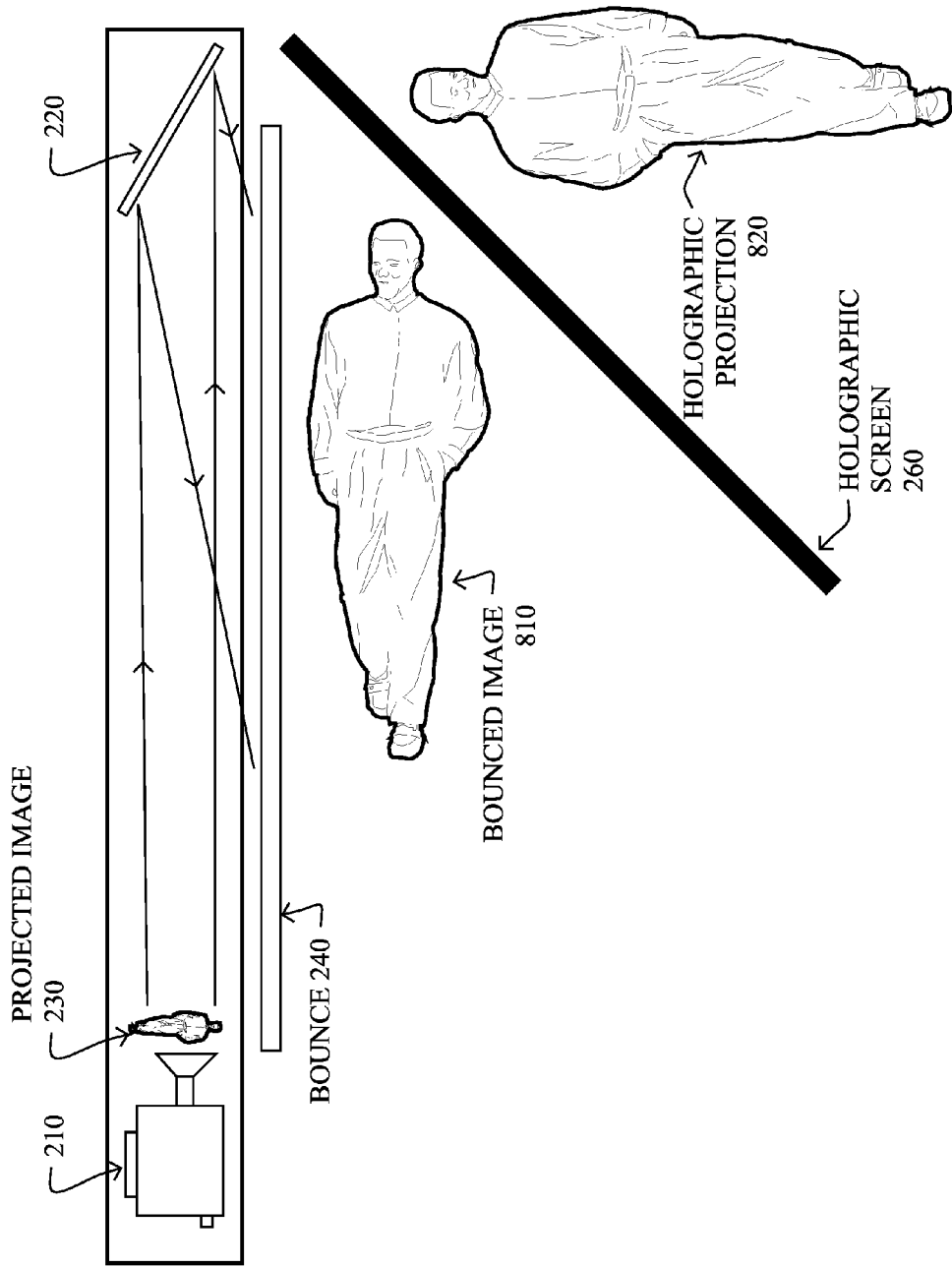
Figure 8D:
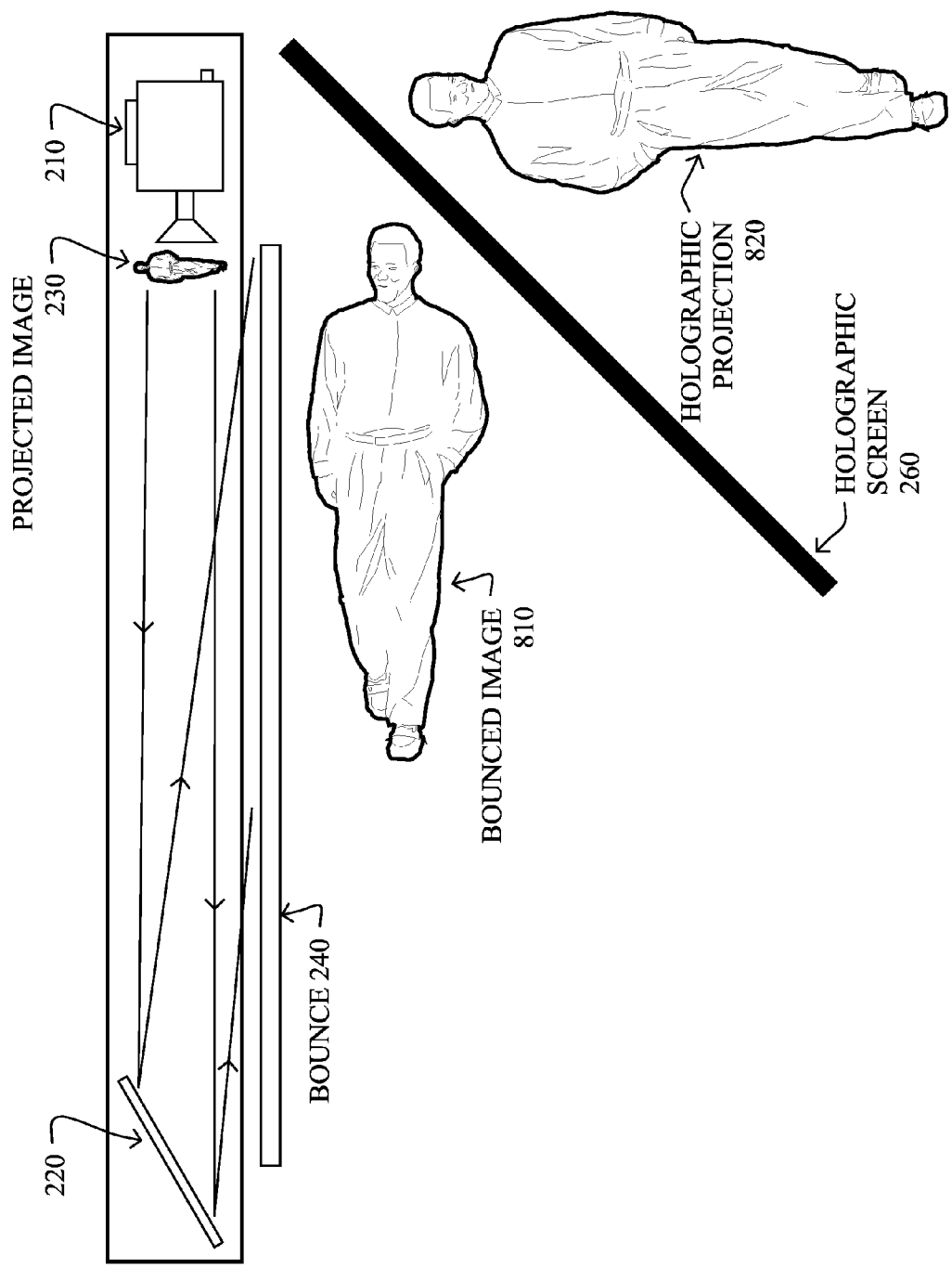

Note that a major constraint in setting up a Pepper's Ghost display, however, is the large space requirement. In order to display a realistic holographic projection, a large amount of depth is typically needed behind the transparent screen. In other words, the appearance of depth behind the transparent screen is very important to the overall holographic projection effect. In certain embodiments, therefore, to further alleviate the large space requirement in setting up a Pepper's Ghost display (that is, since to display a realistic holographic projection, a large amount of depth is typically needed behind the transparent screen), an optical illusion background may be placed behind the transparent screen 260 in order to create the illusion of depth behind the screen (producing a depth perception or "perspective" that gives a greater appearance of depth or distance behind a holographic projection). An example of this is shown in FIG. 6, where an optical illusion background is added behind the screen.

Note further that in still another alternative embodiment, rather than placing the image source on the floor or ceiling, it is possible to place it on the side or wall, such as illustrated in FIGS. 7A-7D. In particular, shown in configurations and orientations similar to those described above, a low-profile bounce 240 is shown on the side, with a transparent holographic screen 260 vertically placed in the middle at a 45-degree angle to the image source. Note that in FIGS. 7A-7B, a rear-projection bounce is used, while in FIGS. 7C-7D a front-projection bounce is used. Again, there may be reasons or situations where one system is better than the other, and the techniques herein are not limited to any particular configuration.

In accordance with an aspect of the present invention, in various configurations it may be necessary to vertically "flip" the images projected from the projector in order to ensure the image's proper orientation on the bounce, and therefore on the holographic screen as it is shown to the viewer. For example, as shown in FIGS. 8A-8D, depending upon the location of the projector 210 and mirror 220, and also depending upon whether rear-projection or front-projection is used, the image from the projector may be vertically oriented appropriately as shown. (Though FIGS. 8A-8D illustrate only a rear-projection bounce, similar orientation considerations would be made for front-projection bounces, accordingly, and the views shown herein are merely an example of the differences in orientation presented by various configurations.)

Figure 9:
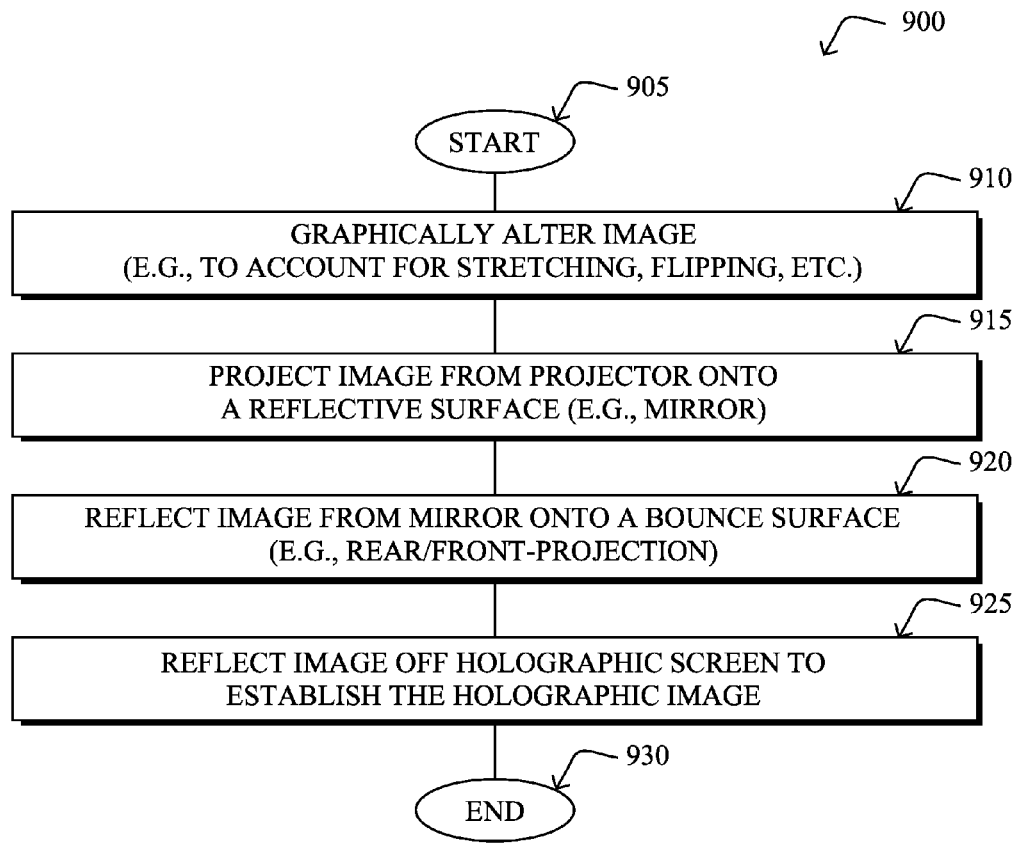
FIG. 9 illustrates an example simplified procedure for using a low-profile bounce chamber for Pepper's Ghost Illusion in accordance with one or more embodiments described herein.

FIG. 9 illustrates an example simplified procedure for using a low-profile bounce chamber for Pepper's Ghost Illusion in accordance with one or more embodiments described herein. The simplified procedure 900 may start at step 905, and continues to step 910, where an image may be graphically altered (e.g., to account for stretching, flipping, etc.). As such, in step 915 a projector projects an image onto a reflective surface (e.g., mirror), which then reflects the image in step 920 onto a bounce surface. As described above, the bounce may be a rear-projection bounce or a front-projection bounce. The image shown on the bounce in step 920 may then be reflected off the holographic screen to establish the holographic image in step 925. The simplified procedure ends in step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for holographic projection techniques that allow for reduced system size, greater system versatility, and greater user experience. In particular, using video panel displays reduces the required set-up area, and also prevents problems associated with atmosphere effects (e.g., fog). In addition, the ability to place the projector on the same side as the bounce may be useful in particular setup situations, such as where lighter frames or no frames are to be used for the holographic screen, and supporting the projector by the frame isn't otherwise possible. That is, other than the holographic screen, there is no requirement for any equipment (projector or bounce) to be located above the holographic image.

The embodiments described herein provide for holographic projection using video panels and also enhanced Pepper's Ghost Illusion techniques (e.g., added depth perception). Notably, the embodiments described herein may be used with holographic projection images produced from a variety of sources, such as live-streamed, pre-recorded, re-constructed, computer-generated, and so on. In general, holographic projections may be used for a variety of reasons, such as entertainment, demonstration, retail, advertising, visualization, video special effects, and so on. The holographic images may be produced by computers that are local to the projectors or video panels, or else may be generated remotely and streamed or otherwise forwarded to local computers.

As an example, by streaming the video image of the performer as a video and projecting it onto a holographic projection system, a true concert or nightclub experience can be transmitted across the globe for the live entertainment experience. For instance, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music is streamed directly from the soundboard of the broadcast venue and sent to state-of-the-art sound systems at the satellite venues. Light shows may accompany the performance with top of the line LED screens and lasers.

As one example of how an image can be generated, as described in commonly owned, co-pending U.S. patent application Ser. No. 14/285,905, entitled "Depth Key Compositing for Video and Holographic Projection" filed on May 23, 2014 by Crowder et al. (the contents of which incorporated by reference herein in its entirety), special depth-based camera arrangements may be used to isolate objects from captured visual images, which may then be used to generate a visual display that shows only those isolated objects as a holographic projection. Other techniques may be used to create holographic projection images, however, and the technique mentioned above is merely one example.

Also, as another example, in computing, an "avatar" is the graphical representation of the user (or the user's alter ego or other character). Avatars may generally take either a two-dimensional (2D) form or three-dimensional (3D) form, and typically have been used as animated characters in computer games or other virtual worlds (e.g., in addition to merely static images representing a user in an Internet forum). To control an avatar or other computer-animated model (where, notably, the term "avatar" is used herein to represent humanoid and non-humanoid computer-animated objects that may be controlled by a user), a user input system converts user action into avatar movement. The systems described herein, therefore, may also be configured to display a holographic projection of an animated avatar, e.g., allowing an individual to interactively control a holographic projection of a character.

Moreover, while there have been shown and described illustrative embodiments, it is to be understood that various other adaptations and modifications may be made within the spirit and scope of the embodiments herein. For example, while the embodiments have been described in terms of video panels, still pictures (stationary images) may also benefit from the techniques herein, and any reference to "video" or "image" or "picture" need not limit the embodiments to whether they are motion or time-sequence photography or still images, etc.

Note also that any two-dimensional holographic imagery techniques may be used herein, and the illustrations provided above are merely example embodiments. Three-dimensional holographic images may also be used, but require multiple camera angles, multiple respective depth ranges, and greater data processing.

Further, the embodiments herein may generally be performed in connection with one or more computing devices (e.g., personal computers, laptops, servers, specifically configured computers, cloud-based computing devices, cameras, etc.), which may be interconnected via various local and/or network connections. Various actions described herein may be related specifically to one or more of the devices, though any reference to particular type of device herein is not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
a bounce chamber having:
   a) a projection bounce having a first end and a second end;
   b) a projector disposed generally at the first end of the projection bounce and configured to provide a light source image for a holographic projection; and
   c) a mirror disposed generally at the second end of the projection bounce and angularly positioned between the projector and projection bounce such that the light source image provided by the projector is reflected onto the projection bounce; and
a reflective transparent screen disposed angularly to the projection bounce;
wherein the light source image, when reflected onto the projection bounce, is further reflected off the screen toward a viewing direction, the light source image reflected off the screen appearing from a perspective of the viewing direction as the holographic projection behind the screen.

2. The apparatus as in claim 1, wherein the projector and the mirror are positioned at a rear portion of the projection bounce, and wherein the projection bounce is configured for rear projection.

3. The apparatus as in claim 1, wherein the projector and the mirror are located on a same side of the projection bounce as the screen, and wherein the projection bounce is configured for front projection.

4. The apparatus as in claim 1, wherein the bounce chamber is configured to alter the light source image to account for reflection of the light source image off of the mirror.

5. The apparatus as in claim 4, wherein the bounce chamber is configured to linearly increase compression of the light source image.

6. The apparatus as in claim 4, wherein the bounce chamber is configured to alter an orientation of the light source image.

7. The apparatus as in claim 1, wherein the screen has first and second portions, wherein the first portion of the screen is closer to the bounce chamber than the second portion, and wherein the projector is closer to the first portion of the screen than that of the mirror.

8. The apparatus as in claim 1, wherein the screen has first and second portions, wherein the first portion is closer to the bounce chamber than the second portion, and wherein the mirror is closer to the first portion of the screen than that of the projector.

9. The apparatus as in claim 1, wherein the screen is a tensioned foil.

10. The apparatus as in claim 1, wherein the screen is a rigid material.

11. The apparatus as in claim 10, wherein the rigid material is selected from a group consisting of: glass; plastic; and plexiglass.

12. The apparatus as in claim 1, further comprising:
an optical illusion background located behind the screen and configured to create an illusion of depth behind the screen.

13. A method, comprising:
providing a bounce chamber having:
   a) a projection bounce having a first end and a second end;
   b) a projector disposed generally at the first end of the projection bounce and configured to provide a light source image for a holographic projection; and
   c) a mirror disposed generally at the second end of the projection bounce and angularly positioned between the projector and projection bounce such that the light source image provided by the projector is reflected onto the projection bounce; and a reflective transparent screen disposed angularly to the projection bounce;
wherein the light source image, when reflected onto the projection bounce, is further reflected off the screen toward a viewing direction, the light source image reflected off the screen appearing from a perspective of the viewing direction as the holographic projection behind the screen.

14. The method as in claim 13, wherein the projector and the mirror are positioned at a rear portion of the projection bounce, and wherein the projection bounce is configured for rear projection.

15. The method as in claim 13, wherein the projector and the mirror are located on a same side of the projection bounce as the screen, and wherein the projection bounce is configured for front projection.

16. The method as in claim 13, wherein the bounce chamber is configured to alter the light source image to account for reflection of the light source image off of the mirror.

17. The method as in claim 16, wherein the bounce chamber is configured to linearly increase compression of the light source image or alter an orientation of the light source.

18. The method as in claim 13, wherein the screen has first and second portions, wherein the first portion of the screen is closer to the bounce chamber than the second portion, and wherein the projector is closer to the first portion of the screen than that of the mirror.

19. The method as in claim 13, wherein the screen has first and second portions, wherein the first portion is closer to the bounce chamber than the second portion, and wherein the mirror is closer to the first portion of the screen than that of the projector.

20. The method as in claim 13, wherein the screen is one of either a tensioned foil or a rigid material.

* * * * *